No. 761,360. PATENTED MAY 31, 1904.
J. W. CLOUD.
ELECTROPNEUMATIC BRAKE.
APPLICATION FILED SEPT. 30, 1901.
NO MODEL. 5 SHEETS—SHEET 1.

Witnesses: Inventor:
John W. Cloud
By Paul Synnestvedt
Att'ys.

No. 761,360. PATENTED MAY 31, 1904.
J. W. CLOUD.
ELECTROPNEUMATIC BRAKE.
APPLICATION FILED SEPT. 30, 1901.
NO MODEL. 5 SHEETS—SHEET 2.
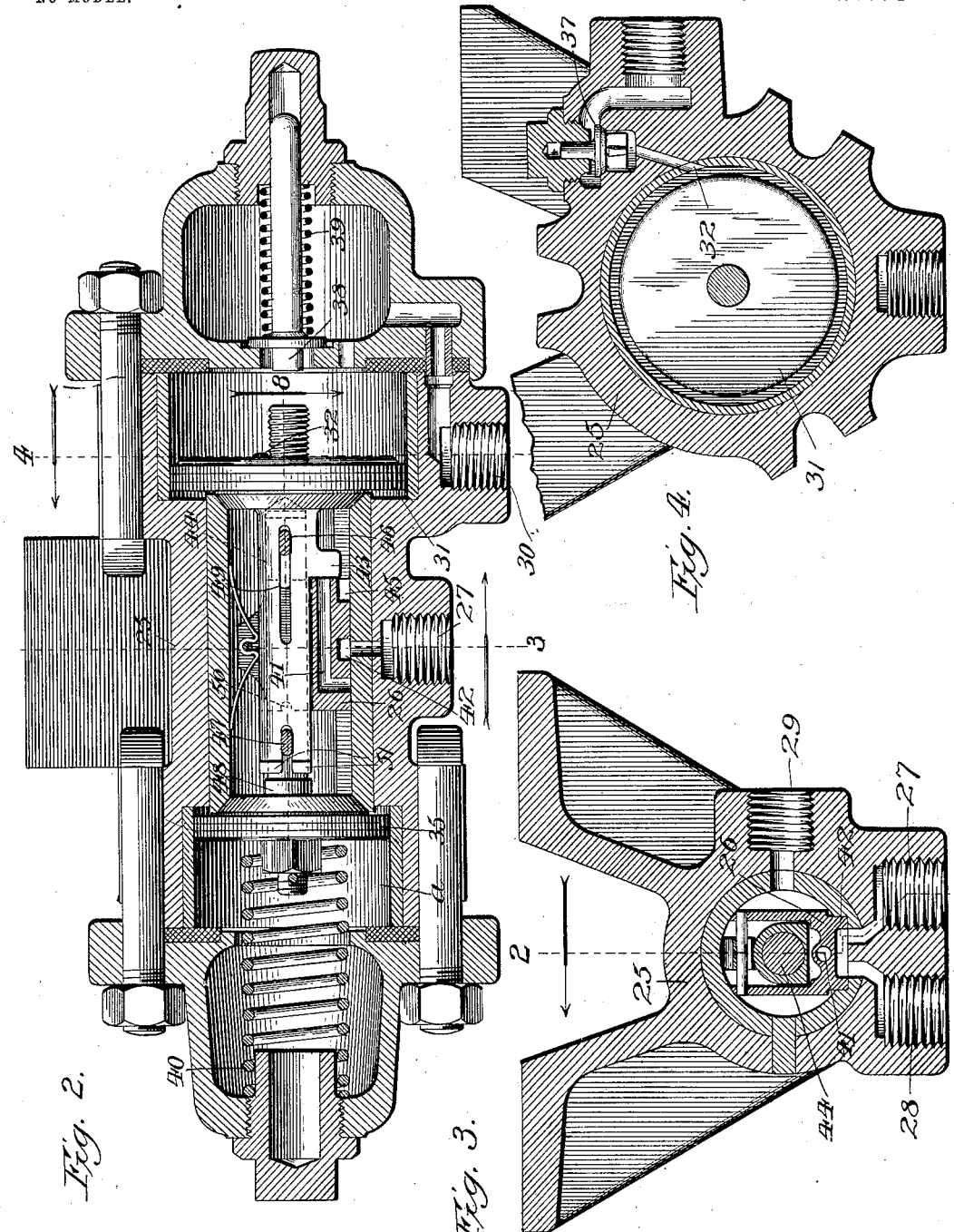
Witnesses:
Inventor:
John W. Cloud
By Paul Synnestvedt
Att'y No. 761,360. PATENTED MAY 31, 1904.
J. W. CLOUD.
ELECTROPNEUMATIC BRAKE.
APPLICATION FILED SEPT. 30, 1901.
NO MODEL. 5 SHEETS—SHEET 3.

Witnesses:
Chas. E. Gaylord,
Geo. C. Davison.

Inventor:
John W. Cloud
By Paul Synnestvedt
Att'ys

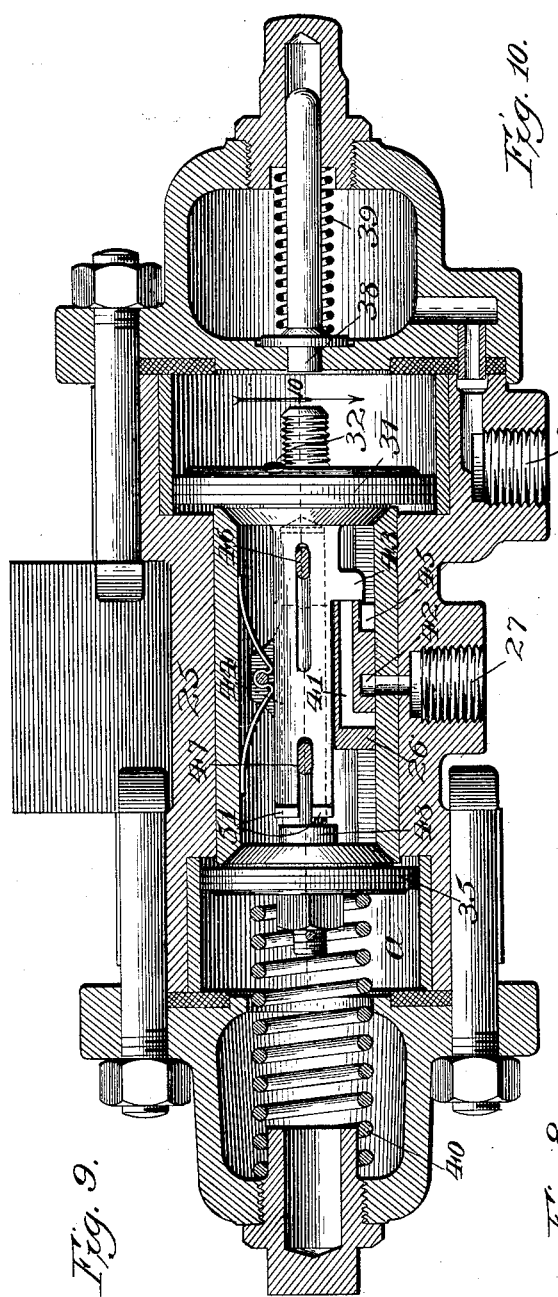
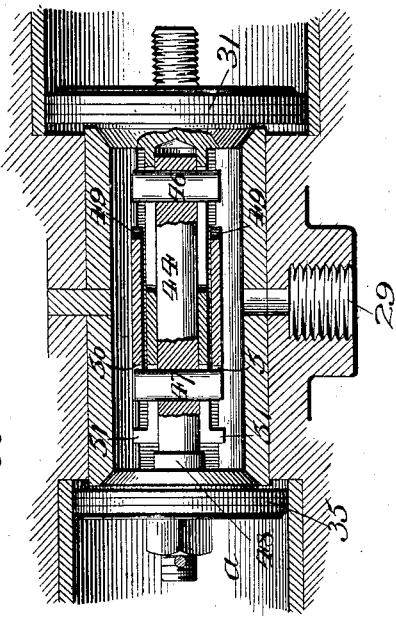
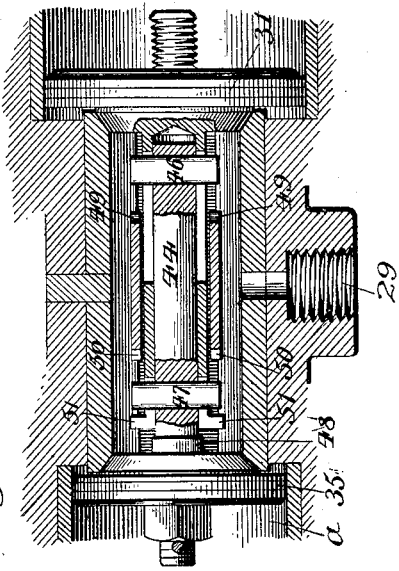

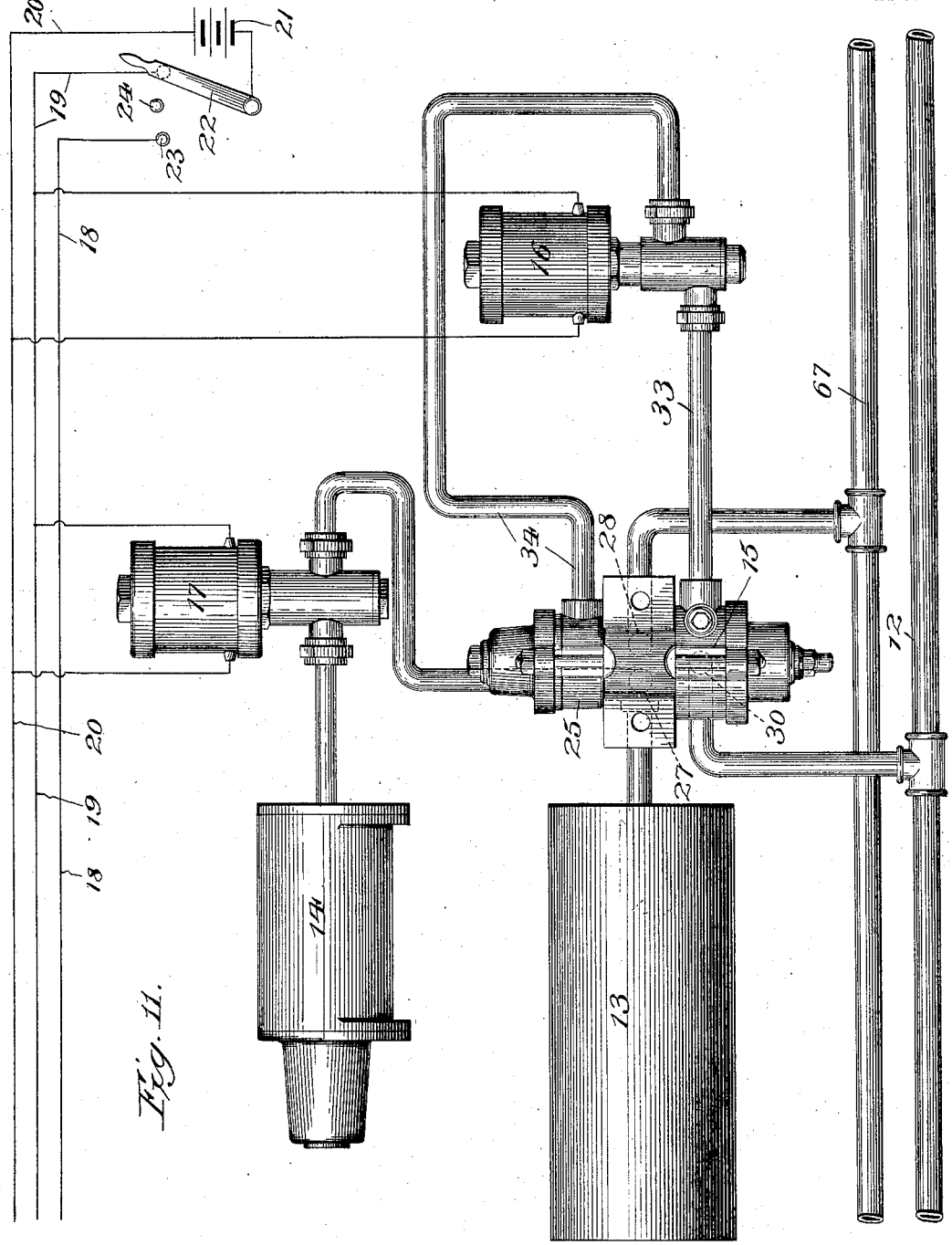

No. 761,360. Patented May 31, 1904.

UNITED STATES PATENT OFFICE.

JOHN WILLS CLOUD, OF LONDON, ENGLAND, ASSIGNOR TO THE WESTINGHOUSE AIR BRAKE COMPANY, OF PITTSBURG, PENNSYLVANIA, A CORPORATION OF PENNSYLVANIA.

ELECTROPNEUMATIC BRAKE.

SPECIFICATION forming part of Letters Patent No. 761,360, dated May 31, 1904.

Application filed September 30, 1901. Serial No. 77,101. (No model.)

*To all whom it may concern:*

Be it known that I, JOHN WILLS CLOUD, a citizen of the United States of America, and a resident of London, England, have invented certain new and useful Improvements in Electropneumatic Brakes, of which the following, taken in connection with the accompanying drawings, is a specification.

This invention has reference to a pneumatic brake system employing a fluid-pressure train pipe, an auxiliary reservoir, and a brake-cylinder, and to the addition thereto of mechanism embodying certain improvements, whereby it is possible, without interfering with the entire and practical operation of the said pneumatic brake system, taken alone, to, at the same time, secure an electric operation of said brake system, which will be complete and efficient in its working, and capable not only of full application and release, but also of what is known as graduated application, and graduated release.

Another object of my invention is the provision of an apparatus of the type specified, which, while capable of complete operation by electrical means, will at the same time be in every respect interchangeable with the fluid-pressure brake mechanism now in common use.

Another object of my invention is the provision of a brake apparatus employing two valves constructed to be actuated by a single electric circuit, and so arranged that in procuring an application of the brakes electrically, it will not be necessary to deplete the pressure of the whole train pipe, but only of a small chamber normally connected therewith which is immediately adjacent to the electrically operated valve piston of each car.

Another object of my invention is the provision of a pneumatically-controlled distributing valve, which besides its pneumatically-controlled piston shall have an electrically-controlled piston, and a slide valve arranged to be operated by either of said pistons, and so constructed that it may be used either as a pneumatic brake or an electric brake, at the will of the engineer, and whether one or the other force be used will be capable of all the operations recognized as essential to a successful and practically operative brake.

Another object of my invention is the provision of a brake mechanism having a pneumatically operative distributing valve to which is added electrically operated mechanism so constructed that in making an application of the brakes electrically the cylinder exhaust valve of said pneumatically operative distributing valve shall be closed through the action of the electric mechanism, and yet will be left in condition such that it may be again opened by operation of the pneumatic devices alone, in case such action be desirable, as it might, for example, in the event of a failure of the brakes on any car to release electrically.

Still another object of my invention is the provision of a fluid-pressure brake mechanism, capable of electric actuation, and provided with novel means whereby the reservoir may be charged with pressure, while the brake is applied, thereby preventing depletion of the effective power, through long continued application, such as is necessary in descending heavy mountain grades.

The above, as well as such other objects as may hereinafter appear, I attain by means of a construction which I have illustrated in preferred form in the accompanying drawings, in which Figure 1 is a general view showing a brake system embodying my invention;

Figure 2 is a sectional view taken on the line 2 of Figure 3, showing the interior construction of the main distributing valve which I employ;

Figure 3 is a sectional view taken on the line 3 of Figure 2, showing a detail of the valve construction;

Figure 4 is a sectional view taken on the line 4 of Figure 2;

Figure 8 is a sectional view showing a portion of the device taken on the line 8 of Figure 2;

Figure 9 is a sectional view of a modified form of my main distributing valve, adapted for use in conjunction with a two-pipe system;

Figure 10 is a partial sectional view taken on the line 10 of Figure 9; and

Figure 11 is a general view showing the arrangement of the parts in connection with a two-pipe system.

Figure 1:
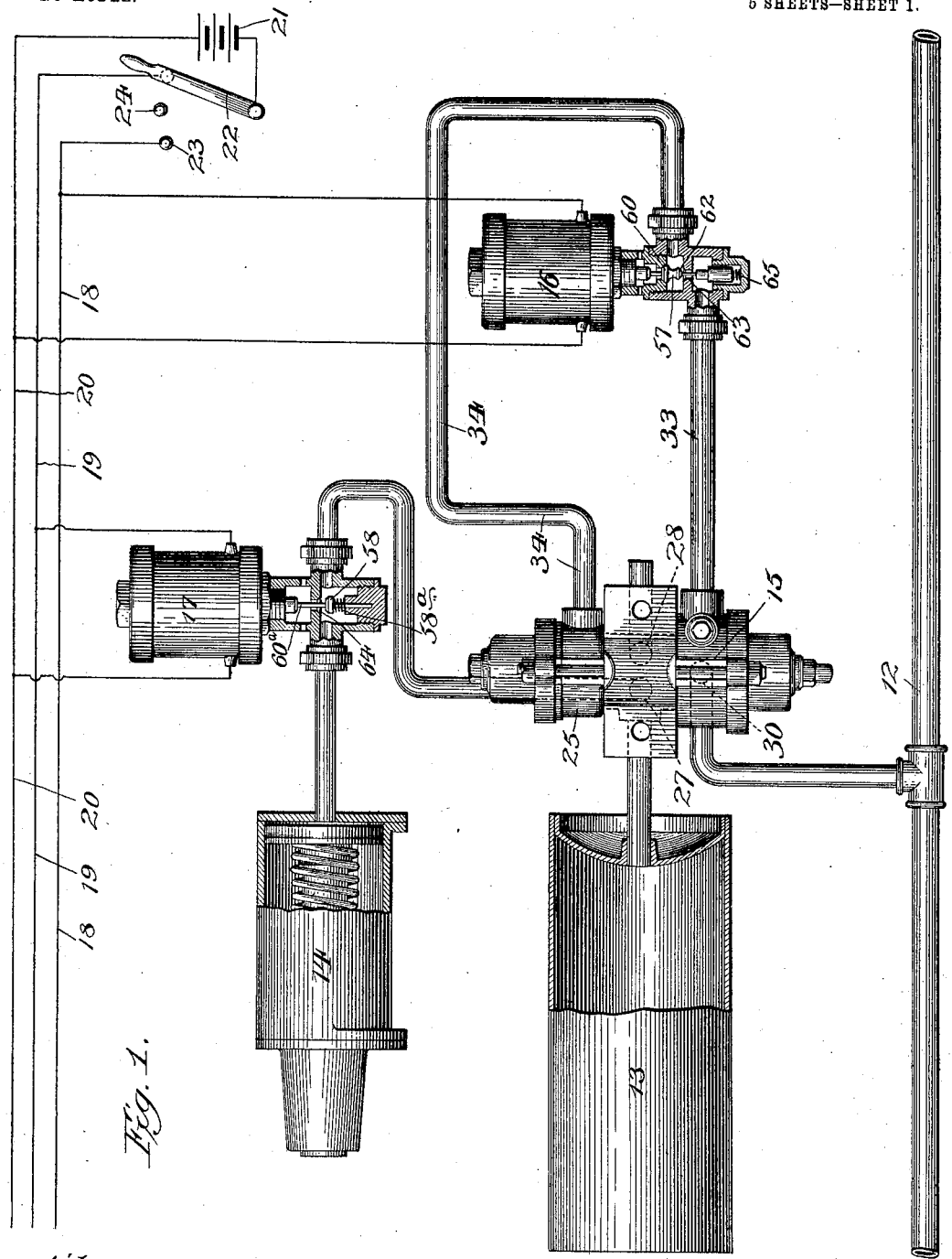

Referring now more particularly to Figure 1, it will be seen that in carrying out my invention, I provide first a main air or train pipe 12, an auxiliary reservoir 13, and a brake-cylinder 14, all adapted to be located under a car of a train in the usual manner, and having the ports and passages there-between controlled by certain apparatus, comprising a main distributing valve 15, an actuating or application magnet device 16, and a release magnet device 17, the said magnet devices being in circuit respectively with wires 18 and 19, which have a common return wire 20, which may be, if desired, the rails of the track.

Upon the locomotive, or at some other convenient place, there is provided, as a source of electricity, some generator, as the battery 21, and an operating switch lever 22, constructed to control the circuit in such a way that the current may be passed through the wire 19, as it is in the position shown, and back through the return wire 20, or through the wire 18, which has the switch contact 23, or may be cut off from both wires by the placing of the handle or lever 22 over the neutral position 24. All of the several magnets throughout the train are arranged in circuit, like those shown, and are adapted preferably for actuation on open circuit. That is, the circuit is intended to be closed only when it is desired to bring the magnet devices into operation in the performance of some function of the brake.

Figure 5:
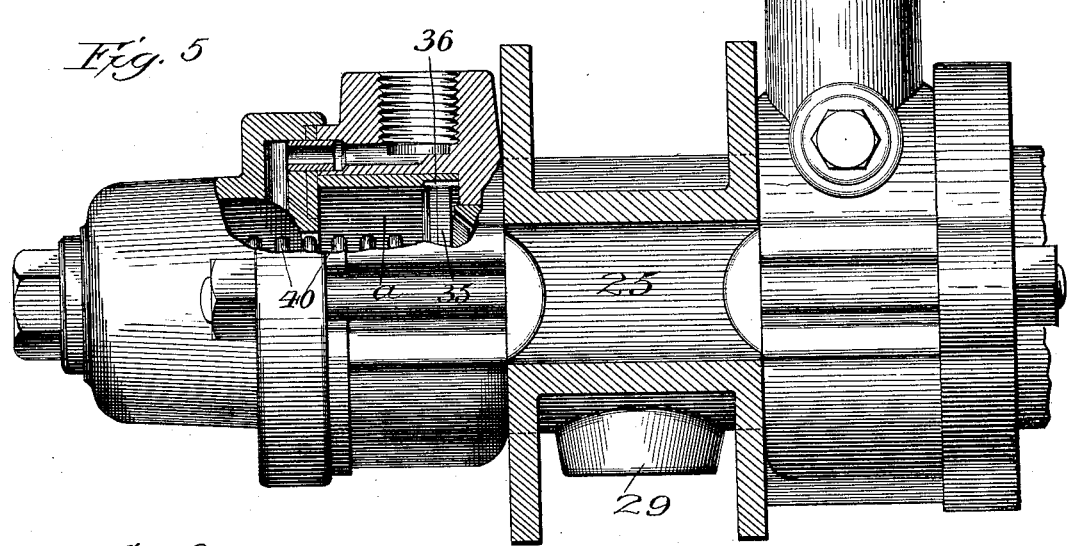
Figure 5 is a partial sectional view showing certain of the side passages of the valve.

Referring now more particularly to Figures 2, 3 and 4, which show the details of what I have called the main distributing valve 15, it will be seen that within a casing 25 there is arranged a slide valve 26, operating to control ports in the bushing thereof, leading to a brake cylinder through the opening 27, and to an exhaust pipe or passage through the opening 28. Communication from the interior of the valve chamber to the auxiliary reservoir 13 is afforded through the opening 29, and the train pipe inlet enters the valve casing in the first instance through the opening 30, and passing thence around against the piston 31 pushes the same to the position shown in Figure 2, which opens a by-passage 32, that leads to the application magnet device 16, through the pipe 33. Leading from the magnet device there is another pipe 34, through which the air flows back to the casing 25, and bears against the piston 35 (see Fig. 5), moving it to the position shown in Figures 2 and 5, in which a small feed passage 36, of the usual construction for feeding the reservoir, is opened to permit the reservoir to be charged in the usual manner.

At some convenient point in the by-passage leading to the magnet device 16, there is located a check valve, shown at 37, intended to prevent a back flow of air from the magnet device to the train pipe when the brake is in operation.

At the right of the piston 31, as shown in Figure 2, there is provided the usual arrangement of graduating stem 38, and spring 39, which perform their functions in the ordinary way. At the left of the piston 35, I provide a spring 40, bearing against the said piston, and tending to hold it in the position shown in said Figure 2.

The slide valve 26 is provided with a graduating port 41, and an exhaust port or cavity 42, the port 41 being opened and closed by the shoulder or projection 43 upon the stem 44 of the piston 31, and the exhaust cavity 42 being adapted to register with the opening 27, when the parts are in the position shown, which is the release position when the brake is being pneumatically actuated. At one end of the valve 26 there is another cavity or "V" shaped opening 45, which serves as an application or admission port to the brake-cylinder from the reservoir when the slide valve is being electrically operated.

As a means of moving the valve 26, when it is being electrically operated, there are provided a couple of cross bars 46 and 47, both of which are fixed to or form a part of the stem 48 of the electrically-controlled piston 35, and are adapted to strike against the valve 26 at the points marked 49 and 50 in procuring reciprocation of said valve in the operation of the brakes electrically.

The movements of the valve 26 obtained pneumatically, are procured through the bearing of the projection 43 against the same on one end and the projection 51 upon the other.

On examination of Figure 2, it will be observed that the distance between the cross pieces 46 and 47 is considerably in excess of the length of the valve, and that when the valve is in the position shown there is a space between the cross piece 47 and the adjacent point 50 of the slide valve, which is more than equal to the amount of movement of the slide valve necessary to close the port to the cylinder marked 27, and cut off the exhaust from the cylinder to the atmosphere. By means of the proportioning of the distances between the said cross pieces referred to, it is possible to operate the valve 26 either electrically or pneumatically, as the engineer may determine, and in a manner which will be described shortly.

Figure 6:
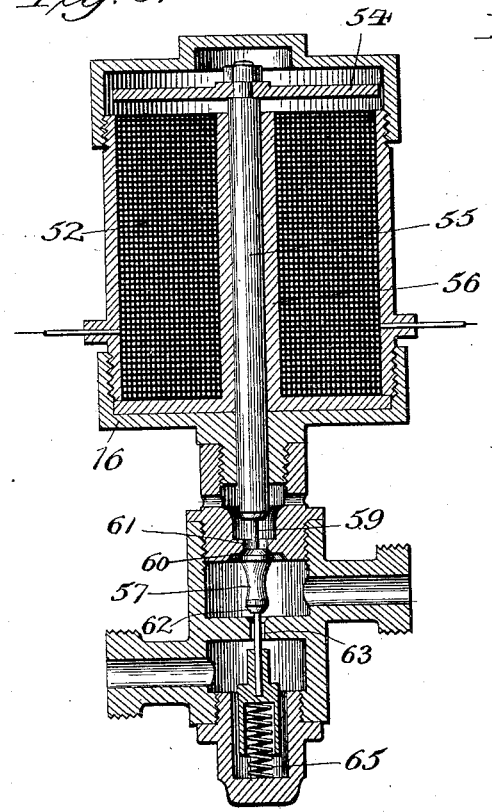
Figure 6 is a vertical section through the operating magnet which controls the application of the brake electrically.
Figure 7:
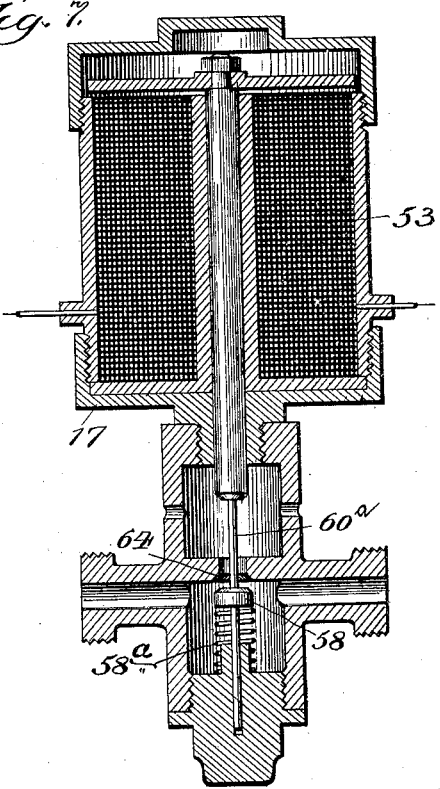
Figure 7 is a sectional view through the release magnet.

The electro-magnet devices which I employ are shown in detail in Figures 6 and 7, wherein 52 represents the magnet coil of the application magnet 16, and 53 the coil of the release magnet 17. The magnet armatures are arranged in the shape of disks 54, carried upon rods 55, which extend down through the center of the magnet cores 53 and 56, and are constructed to operate the device 57 in Fig. 6 and the valves 58 and 60, through the stems 59 and 60ª thereof. The device 57 in Fig. 6, which is the type of application magnet valve mechanism which I prefer to employ, is provided with a valve 60, adapted to close an escape or exhaust passage 61 upon movement upward, and another valve 62, adapted to close an opening 63 on movement downward, the opening 63 leading around through the pipe 34 to the chamber on the outer face of the piston 35. Thus the device 57 is in reality a combination of two alternately acting valves mounted on a common stem and receiving motion from a common magnet, and this valve device controls the flow of air after it passes the piston 31, and before it reaches the piston 35, and also the escape of the pressure to the atmosphere from the outer end of the piston 35, when the brakes are being applied.

By this mechanism it is rendered possible to set the brakes electrically without the necessity of venting from the electric train pipe, but only from that chamber which is on the outside of the piston 35. In other words, by my improvement electric applications of the brakes are made by a single circuit which operate to vent train pipe air from those parts of the pipe only which are next the piston 35 and are by the action of the valve 62 cut off from the main portion of the pipe.

The port controlled by the release valve 58 is an exhaust port 64, arranged to vent the brake-cylinder to the atmosphere when it is desired to take off the brakes.

The operation of my invention is as follows:

The train pipe being supplied with air, the same flows through the pipe 33, passes the valve 63 (because the latter is held in open position by means of the spring 65, the escape port 61 being closed by the valve 60) and feeds past the piston 35, through the feed groove 36, charging the reservoir. In order to reach the reservoir, as will be observed, it is necessary for the air to move both the piston 31 and the piston 35 to the positions shown in Figure 2. Assuming that there is no current in the circuit wires,—in other words, that the handle or controlling switch lever 22 is in the intermediate position 24, the release valve 58 will be closed by its spring 58ª, and the application device 57 will be in the position shown in the several views.

If now it is desired to make an application of the brakes, it can be done either electrically or pneumatically. To do it electrically, the lever 22 of the switch is moved to the contact 23, which sends a current through the magnet 16, and by the action of the armature disk 54, pushes the device 57 down, opening the escape passage 61, and closing the by-pass 63, thus cutting off the air in the main portion of the train pipe from the chamber $a$ at the outer end of the piston 35, and permitting such air as is in such chamber to escape to the atmosphere past the valve 60 through the port 61. As the air is thus exhausted from such chamber, the piston 35 is moved by the auxiliary reservoir pressure at the right thereof to the limit of its travel, carrying with it the valve 26, by means of the cross piece 46, to a position which will first close the exhaust valve cavity 42, which is that which releases the brake when pneumatically operated, and then open a passage for fluid pressure from the reservoir to the brake-cylinder past the slide valve by way of the "V" shaped cavity or recess 45, when reservoir pressure will flow into the cylinder until the two pressures equalize, or until the current is taken off the application magnet 16, when the spring 65 thereof will seat the valve 60 and open the valve 62, which will again admit train pipe pressure to the chamber on the outside of the piston 35, which, aided by the spring 40, will push back the piston 35 to the position shown in Figure 2, which, it will now be observed, will, by the cross piece 47, push the slide valve back to a position to cut off the supply of air to the brake-cylinder, but not sufficiently far to open the exhaust port to the atmosphere through the cavity 42, to do which a pneumatic operation of the distributing valve is required.

If a further application of the brake be desired, assuming that full equalization has not taken place, it can be obtained by again turning current into the circuit wire 18, which will again actuate the two valves 60 and 62, and again cut off the main portion of the train pipe and vent the air in the chamber at the left of the piston 35, and cause another movement of said piston, and a further application of pressure from the reservoir, to the brake-cylinder. The number of times that the lever 22 is moved to the contact point 23, and the length of time it is left in such position, will therefore determine the amount of pressure which will be vented from the reservoir into the brake-cylinder.

To release the brake electrically the lever is now moved to the position shown in Figure 1, when current from the battery will traverse the wire 19, and actuate the release magnet 17, opening the release valve 58, and permitting the pressure which has been admitted to the cylinder 14 to escape to the atmosphere through the port 64, which may be done either completely or by degrees as desired. After the brake is fully released, the lever 22 can be returned to neutral position 24, when the valve 58 will be closed by its spring and the brake will remain released until it is again applied either by the pneumatic or electric means.

From the above it will be obvious that to apply the brake electrically it is not necessary to disturb the controlling mechanism of the pneumatic apparatus at all; all that is necessary being to properly manipulate the switch lever 22, leaving the pipe 12 charged, when the action of the electrically operated mechanism automatically closes the exhaust port of the pneumatically operated distributing valve as described, and permits all the usual functions of the brake to be performed electrically without any interference or assistance from the pneumatic controlling devices.

It will also be obvious that while the brake is applied, the application having been made electrically, the piston 35 will stand in a position such that the feed groove 36 will be uncovered, still without releasing the brakes, by reason of the play of the cross piece 47 allowing slight movement of the piston 35 without moving the slide valve; and if it be desired to increase the charge of pressure in the auxiliary reservoir it can be done to any extent desired at the will of the engineer, by simply allowing more pressure to feed through into the pipe 12 and past the charging groove 36, the fact that the charging operation is subject to the control of both pistons making it possible to do this without introducing any detrimental effect on the action of the brake when pneumatically operated.

In order to apply the brake pneumatically, the engineer makes a reduction in the pressure in the train pipe 12, as is usual in the manipulation of fluid pressure brakes of this kind, and such reduction causes a movement to the right of the piston 31 (see Figure 2) and a corresponding movement of the valve 26 by the projections 51, at which time the opening 32 is closed by the piston 31, the exhaust cavity 42 is closed, and the graduation port 41 is brought opposite the opening to the brake-cylinder, when the reservoir pressure flows into the brake-cylinder until it has reduced to a point slightly below that remaining in the train pipe when the train pipe pressure will slightly move the piston in a left-hand direction, sufficient to close the opening 41, by the projection 43, and cut off the flow of reservoir air to the brake-cylinder. The resistance to further movement caused by the friction of the slide valve 26 will then stop the piston, and hold the brake applied with the amount of force that has been permitted to enter the cylinder at that time.

To release the brake pneumatically the pressure is restored or increased in the train pipe 12, and this, through the piston 31, pushes the slide valve back to the position shown in Figure 2, where the cavity 42 establishes communication from the brake-cylinder connection to the exhaust port, and allows the cylinder pressure to escape to the atmosphere.

Thus in pneumatic application and release, the brake operates exactly like the automatic brake well known in this art, and all that is necessary to make it a pneumatic brake, after it has been used electrically, is to make a reduction and restoration of train pipe pressure which brings the slide valve under control of the pneumatically actuated piston 31, and into a position in which it is not interfered with in any wise by the electrically operative piston 35, as will be evident from an examination of the drawings, particularly Figure 2.

Conversely, to change the device from a pneumatic brake to an electrically actuated brake, all that is necessary is to close the electric application circuit which brings the slide valve 26 to a position in which it is subject to control by the electrically operated piston 35, and will perform the functions already described, by the manipulation of the electrical devices as set forth.

This ready adaptability or convertibility of the device from an electric to a pneumatic contrivance and vice versa is secured in the specific embodiment shown through the arrangement whereby the same slide valve is constructed and arranged to be operated either by the pneumatically operated piston or by the electrically operated piston, and the slide valve is provided with a range of movement upon its seat, controlling the ports therein, which is greater in its total amount than the movement of either of the said pistons. The capacity which this mechanism thus possesses, of permitting a release of the brakes by pneumatic means alone after it has been operated electrically is of great value as a provision against delay of the train or other trouble which might otherwise be encountered in case the electric devices from some defective condition should fail to properly release all the brakes.

It is also to be observed that by this peculiar arrangement of single slide valve and two operating pistons which I employ, with the lost motion between the stem devices and the said valve, it is possible to actuate the valve mechanism by train pipe and reservoir pressure, acting in alternation, so that great certainty and promptness of application are insured. Thus not only have I, by my present invention, provided a device capable of performing all the requisite functions of a successful brake, by means either electric or pneumatic, each independently of the other, but I have also accomplished this by a device which has great simplicity, in that it has but a single slide valve, subject to control in both ways.

In Figures 9, 10 and 11, I have shown a modification of my invention for use in conjunction with two train pipes, the second train pipe 67, being arranged to receive the exhaust from the various controlling valves throughout the train, and carry the exhaust air from the brake-cylinder back to the locomotive, where it may be controlled by any suitable cock within reach of the engineer's hand. When this arrangement is employed, there is not required the same amount of lost motion between the two cross pieces 46 and 47, attached to the electrically operated piston 35 as is shown in Figure 2 and the slide valve, but they may be made as I have shown them in Figures 9 and 10, which are sectional views of a device in all respects essentially like the device shown in the other figures of the drawings, save as to this one particular, that is, the distance between the said cross pieces.

By this arrangement the brake, when it is released electrically, is operated so that with the piston standing in the position shown in Figure 9, the slide valve will also be in the position shown in such figure, in which the communication from the brake-cylinder to the exhaust passage will be open, and the air free to flow back through the pipe 67 to the locomotive, where it may be controlled directly by the engineer, and permitted to escape as he may desire. This arrangement would be particularly applicable to short trains, and could be used either with or without the electric release device 17 as preferred.

While in many respects the specific embodiment of my invention which I have shown is that which I prefer, it is obvious that other specific embodiments of the generic improvement disclosed herein could be used without departing from the spirit of my invention; thus, for example, while the accompanying drawings show that "type" of an air-brake commonly known as the "plain" automatic, it is obvious that my improvements are equally applicable to the well-known quick action automatic brake.

Having thus described my invention, what I claim as new, and desire to secure Letters Patent, is—

1. In a fluid-pressure brake system employing a train pipe, an auxiliary reservoir, and a brake-cylinder, a braking apparatus comprising the combination with valve mechanism constructed to control the application and release of the brake, of a pneumatically-controlled piston, constructed to operate said valve mechanism, and an electrically controlled piston, normally balanced between train pipe and reservoir pressure, and constructed to independently operate said valve mechanism, substantially as described.

2. A braking apparatus (for use in a brake system employing a train pipe, an auxiliary reservoir, and a brake-cylinder), comprising the combination with valve mechanism for controlling the admission of pressure to and exhaust of pressure from said cylinder of a pneumatically actuated piston for operating said valve mechanism, in both application and release of the brakes, and a second piston normally balanced between train pipe and reservoir pressure, and constructed to operate said valve mechanism and electrically actuated devices for operating said second piston substantially as described.

3. In a fluid-pressure brake valve, the combination with a pneumatically controlled piston, and an electrically controlled piston, of a slide valve constructed to be operated by either of said pistons, and having a range of movement greater than that of either of said pistons, substantially as described.

4. A valvular device for fluid-pressure brakes comprising the combination with a pneumatically-controlled piston, and an electrically-controlled piston, of a valve constructed to be operated by either of said pistons without movement of the other, substantially as described.

5. In a fluid-pressure brake system employing a train pipe, an auxiliary reservoir, and a brake-cylinder, a valvular device comprising a pneumatically controlled piston, a second piston subject to electrical control, a chamber between said pistons containing air pressure from said auxiliary reservoir, and a valve in said chamber constructed to be actuated by either of said pistons independently of the other, substantially as described.

6. In a brake apparatus, the combination with a train pipe, an auxiliary reservoir, and a brake-cylinder, of a valvular device comprising a casing, two separate pistons therein, a chamber between said pistons the pressure whereof acts upon the inner faces of both of said pistons, valve mechanism in said chamber subject to actuation by either of said pistons independently of the other, and means for procuring movement of one of said pistons pneumatically and of the other electrically, substantially as described.

7. In a brake apparatus, the combination with a train pipe, an auxiliary reservoir, and a brake-cylinder, of a distributing device comprising two pistons mounted in suitable cylinders, valve mechanism subject to actuation by either of said pistons independently of the other, and means for procuring movement of one of said pistons pneumatically and of the other electrically, substantially as described.

8. A brake apparatus comprising a train pipe, an auxiliary reservoir, a brake-cylinder, a valve and piston mechanism subject to pneumatic control constructed to operate the brake in both graduation and emergency applications and in release, a valve mechanism and second piston subject to electrical control and constructed to independently operate the valve mechanism and apply the brake, and electrically operated valve mechanism for releasing the brake, substantially as described.

9. In distributing devices for an air brake having a train pipe, auxiliary reservoir and brake-cylinder, the combination of a piston, a chamber on one side thereof containing reservoir pressure, a chamber on the other side thereof containing train pipe pressure, a second piston, a chamber on one side thereof containing pressure admitted through a by-passage coming from the chamber on the train pipe side of the first-mentioned piston, and an electrically actuated device controlling the flow of air through said by-passage and the exhaust of air from the portion thereof which leads to the second piston, substantially as described.

10. In a fluid-pressure brake system employing a train pipe, an auxiliary reservoir, and a brake-cylinder, a braking apparatus comprising the combination with a pneumatically-controlled piston, and valve mechanism constructed to be operated by said piston, for effecting the application and release of the brake, of an electrically-controlled valve and piston governed thereby which operate said mechanism independently for applying the brake and balanced between train pipe and reservoir pressure, substantially as described.

11. In a fluid-pressure brake system, employing a train pipe, an auxiliary reservoir, and a brake-cylinder, a braking apparatus comprising the combination of a valve and piston casing, a pneumatically-controlled piston operating in said casing between reservoir and train pipe pressure, and a second piston exposed to reservoir pressure on one side and to the pressure of a chamber upon the other side, said chamber being supplied from the train pipe, and provided with a vent port, subject to the control of a magnetically-actuated valve, and valve mechanism for effecting the application and release of the brakes, operated by said pistons, substantially as described.

12. The combination with an application valve for air brakes having a train pipe, of a piston actuating said valve, a pressure chamber on one side of said piston, a communicating passage between said train pipe and said pressure chamber, an exhaust opening for venting said chamber, and valve mechanism for opening and closing said passage and vent opening, and independent means for operating said valve mechanism electrically, substantially as described.

13. An air brake apparatus comprising the combination with a pneumatically-operative distributing device, provided with an exhaust valve, of electrically operated mechanism, provided with means whereby in electric application of the brakes said exhaust valve is closed, and means whereby said exhaust valve may be again opened by operation of the pneumatic devices alone, substantially as described.

14. In fluid brake operating mechanism, the combination with a valve device having two pistons and pipes leading indirectly from behind each of said pistons to the valve chamber, of an electrically operated valve provided with a double acting valve plug having oppositely disposed seats at the two ends, and adapted to open communication between the two pipes leading to said pistons, or to exhaust one or both of said pipes, substantially as described.

JOHN WILLS CLOUD.

Witnesses:
PAUL SYNNESTVEDT,
H. H. WESTINGHOUSE.